UNITED STATES PATENT OFFICE.

WALTER RENTON INGALLS AND FRANCIS WYATT, OF NEW YORK, N. Y.

TREATMENT OF ORES OF ZINC.

SPECIFICATION forming part of Letters Patent No. 516,016, dated March 6, 1894.

Application filed October 3, 1893. Serial No. 487,073. (No specimens.)

*To all whom it may concern:*

Be it known that we, WALTER RENTON INGALLS, a citizen of the United States, and a resident of the city, county, and State of New York, and FRANCIS WYATT, a subject of Her Britannic Majesty, and a resident of said New York city, have invented certain new and useful Improvements in the Treatment of Ores of Zinc, of which the following is a specification.

Our invention relates to processes for treating ores of zinc and is an improvement on the process described in United States Letters Patent No. 203,849, issued to Edward A. Parnell May 21, 1878. Such process consists substantially of an oxidizing roasting of the ore, lixiviation of the roasted ore with water and sulphuric acid by which the zinc is dissolved as sulphate, while the lead, iron, and quartz remain undissolved, evaporation of the solution of zinc sulphate nearly to dryness when it is mixed with blende in such proportion that the zinc in the blende amounts to one third the zinc in the zinc sulphate, drying the mixture of blende and zinc sulphate and heating in a closed furnace or oven, whereby the zinc sulphate and zinc sulphide are reduced to zinc oxide with the evolution of sulphurous anhydride gas. We have discovered that in effecting this reduction with raw blende any impurities which the blende may contain are carried into the zinc oxide, the resulting product. If the blende contains silver, moreover, it is not easy to recover that metal in retorting the zinc oxide. To obviate these difficulties and disadvantages, we have modified said process as follows: We separate one fourth of the original solution of zinc sulphate from the rest of said solution and precipitate the zinc contained in said one fourth by means of sodium sulphide or other sulphide of an alkaline base. The zinc sulphide thus precipitated is practically free from impurities and is used for the reduction of the zinc sulphate in the remainder of the original solution by evaporating said remainder, mixing the precipitated sulphide therewith and heating in a suitable furnace evolving sulphurous anhydride gas as stated above. In precipitating the zinc from the sulphate solution by means of sodium sulphide there is formed a solution of sodium sulphate. By evaporating the solution of sodium sulphate and heating the solid salt with coal-slack, sodium sulphide is produced, which may be used in precipitating a fresh quantity of zinc.

We claim—

The above described process of treating ores of zinc which consists: first in subjecting the ore to an oxidizing roasting; second, lixiviating the roasted ore with water and sulphuric acid; third, separating one fourth of the zinc sulphate solution thereby formed from the rest and precipitating the zinc from said separated portion by means of a sulphide of an alkaline base; fourth, evaporating the remainder of the zinc sulphate solution to dryness and mixing the precipitated sulphide therewith; and lastly heating the mixture in a suitable furnace whereby sulphurous anhydride gas is evolved.

WALTER RENTON INGALLS.
FRANCIS WYATT.

Witnesses:
J. KENNEDY,
W. P. PREBLE, Jr.